(12) United States Patent
McGinley et al.

(10) Patent No.: US 7,188,475 B2
(45) Date of Patent: Mar. 13, 2007

(54) STARTING AND CONTROLLING SPEED OF A TWO SPOOL GAS TURBINE ENGINE

(75) Inventors: Ray M. McGinley, Fountain Hills, AZ (US); Alan B. Luebs, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 292 days.

(21) Appl. No.: 10/742,210

(22) Filed: Dec. 18, 2003

(65) Prior Publication Data

US 2006/0150633 A1  Jul. 13, 2006

(51) Int. Cl.
  *F02C 3/10* (2006.01)
(52) U.S. Cl. .............. 60/726; 60/791; 60/793
(58) Field of Classification Search .......... 60/39, 60/24, 726, 791, 792, 793; 290/4 R
  See application file for complete search history.

(56) References Cited

U.S. PATENT DOCUMENTS

| | | | |
|---|---|---|---|
| 4,183,420 A * | 1/1980 | Kinoshita | 180/301 |
| 4,470,261 A * | 9/1984 | Kronogard et al. | 60/709 |
| 4,771,606 A | 9/1988 | Mose et al. | |
| 5,301,499 A | 4/1994 | Kure-Jensen et al. | |
| 5,635,768 A | 6/1997 | Birch et al. | |
| 6,175,217 B1 | 1/2001 | Da Pointe et al. | |
| 6,442,945 B1 * | 9/2002 | Rakhmailov | 60/791 |
| 2002/0190695 A1 | 12/2002 | Wall et al. | |

* cited by examiner

*Primary Examiner*—Louis J. Casaregola
(74) *Attorney, Agent, or Firm*—Ingrassia Fisher & Lorenz

(57) ABSTRACT

Two spool gas turbine engines are often used to drive variable speed loads, such as an electric generator, or the fan/propeller of aircraft engines. The gas turbine engine must be designed to withstand transient speed and temperature conditions which are encountered when sudden changes to the load on the generator, fan, or propeller occur. By adding a relatively small motor/generator to the gas generator spool of the gas turbine engine, the compressor speed and airflow can be quickly adjusted to compensate for external load changes. This reduces the severity and duration of the transient conditions, resulting in decreased operation and reliability problems such as overspeed, compressor surge, and high turbine temperature. The motor/generator may also be used as an engine starting device.

26 Claims, 2 Drawing Sheets

STARTING AND CONTROLLING SPEED OF A TWO SPOOL GAS TURBINE ENGINE

BACKGROUND OF THE INVENTION

The present invention relates generally to starting and controlling the speed of a two spool gas turbine engine and, in particular, to providing a motor/generator to add or subtract power to the gas generator spool of a two spool gas turbine engine.

Two spool gas turbine engines are often desirable solutions as prime movers for various transportation applications. These engines consist of a gas generator spool and a power turbine spool. Most of the output power of the engine is taken by mechanically connecting a load to the power turbine spool. Very often, the load has a high inertia and engine response to load changes is relatively slow.

For example, when the load connected to the power turbine spool consists of an electrical generator, the electrical loads connected to the generator may be suddenly applied or removed. Because the gas turbine engine cannot respond as quickly as desired, a rapid load transient may cause operational and reliability problems, such as compressor surge and high turbine temperature. When a load is suddenly removed, the speed of the power turbine spool may increase above the desirable operating maximum speed, resulting in an overspeed condition. Conventional two spool gas turbine engines are often designed, at the expense of weight, cost and reliability, to accommodate the engine speed response to sudden load changes and to avoid compressor surge, overtemperature and overspeed.

In another example the load connected to the power turbine spool consists of the fan (or propeller) of an aircraft turbofan (or turboprop) gas turbine engine. Rapid load changes can cause operational and reliability problems as described above.

Mose et al., U.S. Pat. No. 4,771,606, disclose a helper drive apparatus for a turbine drive system in which a load is mainly driven by a turbine and a helper motor is used for assisting the drive for the load, particularly when the cost of electric power is favorable compared to the cost of steam power which drives the turbine. The Mose invention, however, requires the availability of external (utility) power and does not address the problem of controlling the shaft speed of a two spool gas turbine engine, especially during generator load transients.

Kure-Jensen et al., U.S. Pat. No. 5,301,499, disclose a system and method for anticipating and controlling overspeed in a combined cycle gas and steam turbine engine. The Kure-Jensen patent discloses maintaining the engine speed within desirable limits through a control system which anticipates overspeed conditions and jointly controls the fuel flow valve of a gas turbine and the steam control valve of a steam turbine. The Kure-Jensen invention, however, cannot be applied to a simple gas turbine engine.

Birch et al., U.S. Pat. No. 5,635,768, disclose a system for maintaining the engine speed within desirable limits by controlling the external electric load while incorporating a motor to control the fuel supplied to the engine. The Birch invention however cannot be applied to applications where the gas turbine engine is the only primary source of electrical power and limiting the electrical load is not practical.

As can be seen, there is a need for an improved method and apparatus for starting and controlling the speed of a two spool gas turbine engine such that compressor surge, overtemperature and overspeed may be minimized.

SUMMARY OF THE INVENTION

In one aspect of the present invention, an apparatus for controlling the rotational speed of a drive shaft of an electrical generator comprises a gas generator shaft; a motor/generator connected to the gas generator shaft, wherein rotation of the gas generator shaft affects rotation of the drive shaft; a engine control unit capable of receiving measurement of at least one condition reflective of a change in external electric load on the generator; and a motor/generator controller providing power to the motor/generator based on the measurement, thereby adjusting the rotational speed of the gas generator shaft.

In another aspect of the present invention, an apparatus for controlling the speed of a two spool gas turbine engine comprises a motor/generator rotationally attached to a gas generator shaft of the gas turbine engine; an electrical generator having a drive shaft rotationally attached to a power turbine shaft of the gas turbine engine; at least one sensor for measuring at least one condition reflective of a change in external electric load drawn from the generator; and a motor/generator controller for powering the motor/generator to adjust the rotational speed of the gas generator shaft based on the amplitude of the external electric load.

In yet another aspect of the present invention, an apparatus for controlling the speed of a drive shaft of a generator attached to a power turbine shaft of a two spool gas turbine engine comprises a motor/generator rotationally attached to a gas generator shaft of the gas turbine engine; at least one sensor for measuring at least one condition reflective of a change in external electric load drawn from the generator; a motor/generator controller for powering the motor/generator to adjust the rotational speed of the gas generator shaft which in turn adjusts the rotational speed of the power turbine shaft to power the electrical generator based on the external electric load; and an engine control unit for receiving a measurement from at least one sensor and for instructing the motor/generator controller to drive the motor/generator based on the measurement.

In a further aspect of the present invention, a two spool gas turbine engine comprises a power turbine shaft having a generator rotationally attached thereto; a power turbine attached to the power turbine shaft; a gas generator shaft driven by a turbine of the gas turbine engine; a compressor and a turbine attached to the gas turbine shaft; the gas generator shaft providing a hot gas air flow to rotate the power turbine and the power turbine shaft, thereby driving the electrical generator; a motor/generator rotationally attached to the gas generator shaft; at least one sensor for measuring at least one condition reflective of a change in external electric load drawn from the generator; and a motor/generator controller for powering the motor/generator to adjust the rotational speed of the gas generator shaft which in turn adjusts the rotational speed of the power turbine shaft to power the electrical generator based on the amplitude of the external electric load.

In still a further aspect of the present invention, a method for controlling the speed of a two spool gas turbine engine comprises rotationally attaching a motor/generator to a gas generator shaft of the gas turbine engine; rotationally attaching a drive shaft of an electrical generator to a power turbine shaft of the gas turbine engine; measuring at least one condition reflective of a change in external electric load drawn from the generator; and adjusting the rotational speed of the gas generator shaft which in turn adjusts the rotational speed of the power turbine shaft to power the electrical generator based on the amplitude of the external electric load by providing an output from a motor/generator controller to power the motor/generator.

In another aspect of the present invention, a method for preventing compressor surge, overtemperature and overspeed in a two spool gas turbine engine, the two spool gas turbine engine having a generator attached to a power turbine shaft driven by a hot gas air flow generated by a gas generator, comprises measuring a condition reflective of a change in an external electric load on the generator; and adjusting the speed of the gas generator shaft with a motor/generator rotationally attached to the gas generator shaft.

In an additional aspect of the present invention, the load on the power turbine shaft may be mechanical rather than an electrical generator, as for example the fan (or propeller) of an aircraft turbofan engine. In this case the apparatus comprises a motor/generator rotationally attached to a gas generator shaft of the gas turbine engine; at least one sensor for measuring at least one condition reflective of a change in fan (or propeller) load; a motor/generator controller for powering the motor/generator to adjust the rotational speed of the gas generator shaft based on the fan (or propeller) load; and an external electrical bus of relatively small (but sufficient) capacity to accept power from or provide power to the motor/generator. The electrical bus type may be either alternating current or direct current.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a small motor/generator which may be added to the gas generator spool of a gas turbine engine to quickly adjust the compressor speed and airflow to compensate for external load changes. The motor/generator may add or subtract power to the gas generator spool whenever a significant load change occurs, thereby reducing the response time of the system to sudden load changes. Unlike conventional engine speed adjustment means, which typically rely on a control of the flow of fuel to the gas turbine engine, the present invention results in a more immediate adjustment of the gas turbine compressor speed, which adjusts the air flow and pressure through the gas generator turbine and the power turbine. This adjusted air flow and pressure, in conjunction with the conventional fuel flow adjustment, reduces the response time required for the engine to accelerate/decelerate.

The method and apparatus of starting and controlling the speed of a two spool gas turbine engine according to the present invention may be useful in any application that uses a two spool gas turbine engine. Such applications include, but are not limited to, aircraft and ground-based vehicles, such as tanks and transport vehicles.

Figure 1:
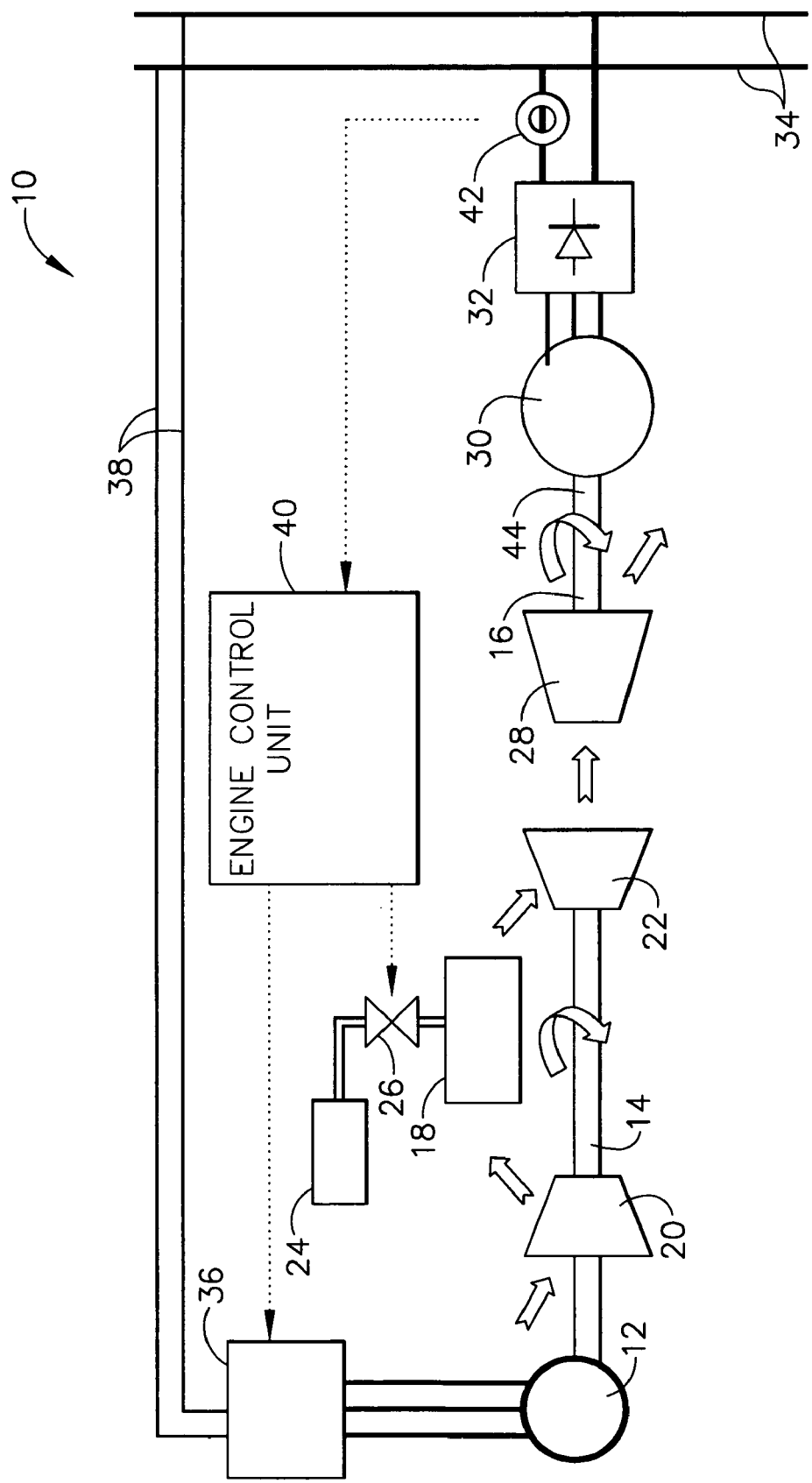
FIG. 1 is a schematic drawing showing a typical two spool gas turbine engine equipped with a motor/generator according to the present invention.

Referring to FIG. 1, there is shown a schematic drawing of a two spool gas turbine engine 10 equipped with a variable speed motor/generator 12 according to the present invention. Two spool gas turbine engine 10 may include a gas generator shaft 14 and a power turbine shaft 16. Discharge gas from a combustor 18 may pass through a compressor 20 to drive a turbine 22. Compressor 20 and turbine 22 may both be mounted on gas generator shaft 14. Combustor 18 may receive fuel from a fuel source 24. The flow of fuel from fuel source 24 to combustor 18 may be regulated by a valve 26.

Air flow may travel from turbine 22 along the path indicated by arrow A to a power turbine 28 mounted on power turbine shaft 16. A drive shaft 44 of a generator 30 may be connected to power turbine shaft 16 such that rotation of power turbine shaft 16 by power turbine 28 may drive generator 30. In some embodiments, drive shaft 44 may be formed integrally with power turbine shaft 16. The output from generator 30 may pass through a rectifier 32 to electrically energize a DC bus 34.

The operational problems of conventional two spool gas turbine engines, as discussed above, can be mitigated by the addition of motor/generator 12 to gas generator shaft 14. Motor/generator 12 may add or subtract power to or from gas generator shaft 14 whenever a significant load change occurs, as further described below. This results in a reduced response time of the system to sudden and/or transient load changes. Motor/generator 12 may be a brushless dc motor/generator with permanent magnets on the rotor, often referred to as a PM starter-generator. These motor/generators are used on hybrid electric automotive vehicles. Alternatively, any other controllable electrical machine configuration, such as a wound field motor/generator or a switched reluctance motor/generator, may be used as motor/generator 12.

Motor/generator 12 may be controlled by a bidirectional motor/generator controller 36, having the ability to regulate the speed and power of motor/generator 12. Motor/generator controller 36 may control, for example, the current, voltage, phase sequence, and frequency supplied to motor/generator 12. Motor/generator controller 36 may draw power from DC bus 34 via electrically conducting wires 38. Motor/generator controller 36 may also be capable of supplying power to DC bus 34 from gas generator shaft 14 via electrically conducting wires 38.

An engine control unit 40 may sense a load change from load sensor 42 and send a command to motor/generator controller 36 to add or subtract power to motor/generator 12. Engine control unit 40 may also be used to control the flow of fuel through valve 26 into combustor 18 relative to the load sensed by load sensor 42. In other words, when an external electric load (not shown) is added to the system, the draw on DC bus 34 increases, resulting in a need for an increase in the speed of gas generator shaft 14. Load sensor 42 may detect the additional draw. Engine control unit 40 may then signal motor/generator controller 36 to increase the power to motor/generator 12, which in turn increases the air flow through the gas generator spool. Engine control unit 40 may also simultaneously increase the fuel flow through valve 26 into combustor 18. The combination of increased fuel flow and increased air flow results in achieving much faster response than the conventional engine control acting solely on increased fuel flow.

When the situation is reversed, that is, when a load is removed from the system, the draw on DC bus 34 decreases, resulting in a need for a decrease in the speed of gas generator shaft 14. Load sensor 42 may detect the reduced electric draw. Engine control unit 40 may then signal motor/generator controller 36 to decrease the power to motor/generator 12. When a load decrease is detected, in order to minimize the chance of an overspeed condition, motor/generator controller 36 may supply a controlled amount of power to DC bus 34, thereby adding load to gas generator shaft 14, thereby more rapidly slowing down the speed of gas generator shaft 14 as compared to, for example, slowing down the speed of the gas generator shaft 14 only by reducing fuel flow to combustor 18.

In some embodiments, motor/generator 12 may be attached directly on gas generator shaft 14. Alternatively, motor/generator 12 may be gear driven and may be mounted to a gearbox pad (not shown). Any suitable means may be used to connect the output of motor/generator 12 with gas generator shaft 14.

While the present invention has been described using a separate engine control unit 40, motor/generator controller 36 and motor/generator 12, one or more of these components may be integrated in a single unit. For example, motor/generator controller 36 may be integrated with engine control unit 40, or motor/generator controller 36 may be integrated with motor/generator 12.

Engine control unit 40 has been described as receiving a load sense input from load sensor 42, however, the invention is not meant to be limited to this specific measurement to detect changes in electric load. For example, the gas temperature of the power turbine may be measured to detect a potential overtemperature condition.

Motor/generator 12 may also be used as an engine starting device. Upon engine startup, motor/generator controller 36 may power motor/generator 12 to turn gas generator shaft 14 to assist in the starting of the gas turbine engine. The motor/generator is capable of assisting to higher starter cutout speeds than the conventional dc brush motors typically in use.

Figure 2:
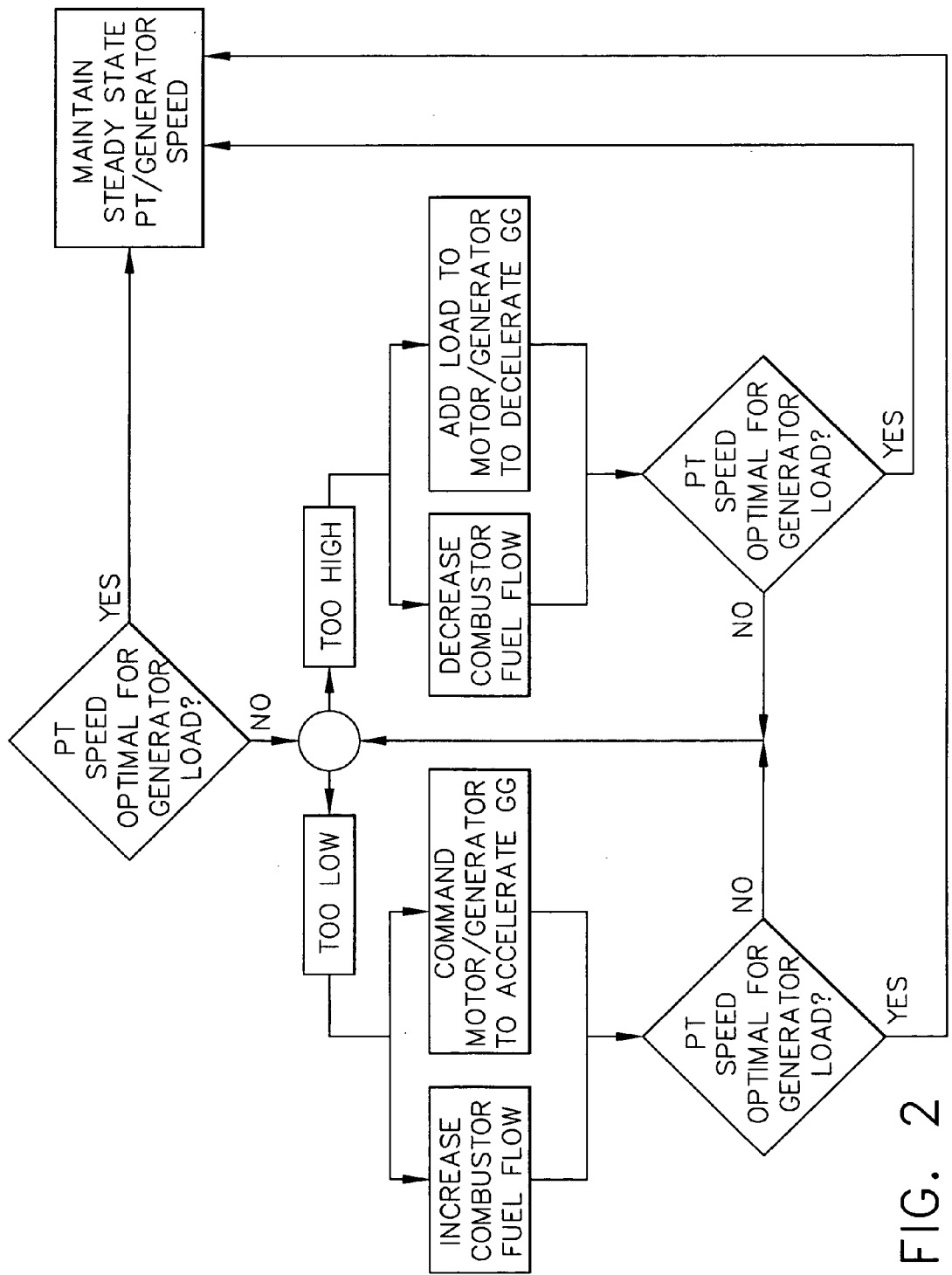
FIG. 2 shows a flow chart of one embodiment of a method according to the present invention.

Referring now to FIGS. 1 and 2, one embodiment of a method according to the present invention is described. The external electric load (not shown) on generator 30 may be measured by a sensor 42. This measurement will be used by engine control unit 40 to determine if the power turbine speed is optimal for the generator load. If the power turbine speed is optimal, the engine control unit maintains a steady state generator speed. If the power turbine shaft rotational speed is not optimal for the electrical generator load (either too fast or too slow), the speed of gas generator shaft 14 may be adjusted. This may be accomplished by adjusting the power supplied to or extracted from motor/generator 12, which will directly affect the rotational speed of gas generator shaft 14. Engine control unit 40 may also adjust the flow of fuel from fuel source 24 into combustor 18. The adjustment of the fuel flow also changes the drive shaft rotational speed for generator 30, albeit not as quickly as motor/generator 12.

As turbine 22 generates more or less power to adjust the speed of gas generator shaft 14, the power to motor/generator 12 may be further adjusted to a point where motor/generator 12 is no longer affecting the rotational speed of gas generator shaft 14, but rather, combustor 18 now has sufficient output to drive gas generator shaft 14 and power turbine shaft 44 at the speed appropriate for the load on electrical generator 30. Measurement of the external electric load is then continued. When another change in external electric load, requiring additional or reduced shaft rotational speed into generator 30, is detected, the process described in FIG. 2 begins again, rapidly adjusting gas generator shaft 14 speed with motor/generator 12 while simultaneously adjusting the gas temperature from combustor 18 to rapidly converge on a new steady state speed appropriate for the new load.

It should be understood, of course, that the foregoing relates to preferred embodiments of the invention and that modifications may be made without departing from the spirit and scope of the invention as set forth in the following claims.

We claim:

1. An apparatus for controlling the rotational speed of a power turbine shaft, comprising:
   a gas generator shaft;
   a motor/generator connected to said gas generator shaft, wherein rotation of said gas generator shaft affects rotation of said power turbine shaft;
   an engine control unit capable of receiving measurement of at least one condition reflective of a change in a load on said power turbine shaft; and
   a motor/generator controller providing power to said motor/generator based on said measurement, thereby adjusting the rotational speed of said gas generator shaft, causing increased or decreased gas flow through the gas path components and thereby adjusting the rotational speed of said power turbine shaft.

2. The apparatus according to claim 1, wherein said gas generator shaft is a component of a two spool gas turbine engine.

3. The apparatus according to claim 1, wherein said power turbine shaft is a component of a two spool gas turbine engine.

4. The apparatus according to claim 2, wherein said change is a result of a change in external load on an electrical generator driven by said power turbine shaft.

5. The apparatus according to claim 4, wherein said at least one condition is at least one of temperature of said gas turbine engine, response of said gas turbine engine, or external electric load on said electrical generator.

6. The apparatus according to claim 4, wherein said at least one condition is external electric load on said electrical generator.

7. The apparatus according to claim 1, wherein said motor/generator is a brushless DC motor/generator having permanent magnets.

8. The apparatus according to claim 2, wherein a fuel supply to said gas turbine engine is controlled by said engine control unit based on said measurement, thereby controlling said rotational speed of said power turbine shaft of an electrical generator driven by said power turbine shaft.

9. The apparatus according to claim 1, wherein at least one of said motor/generator and said motor/generator controller are formed as a single unit.

10. The apparatus according to claim 1, wherein at least one of said motor/generator, said motor/generator controller, and said engine control unit are formed as a single unit.

11. The apparatus according to claim 1, wherein said motor/generator is attached directly to said gas generator shaft.

12. The apparatus according to claim 2, wherein said motor/generator is capable of starting said gas turbine engine.

13. An apparatus for controlling the speed of a two spool gas turbine engine comprising:
    a motor/generator rotationally attached to a gas generator shaft of said gas turbine engine;

an electrical generator having a drive shaft rotationally attached to a power turbine shaft of said gas turbine engine;

at least one sensor for measuring at least one condition reflective of a change in an amplitude of an external electric load drawn from said electrical generator; and a motor/generator controller for powering said motor/generator to adjust the rotational speed of said gas generator shaft.

14. The apparatus according to claim 13, further comprising an engine control unit for receiving a measurement from said at least one sensor and for instructing said motor/generator controller to drive said motor/generator based on said measurement.

15. The apparatus according to claim 14, wherein a fuel supply to said gas turbine engine is controlled by said engine control unit based on said measurement, thereby controlling a rotational speed of said gas generator shaft.

16. The apparatus according to claim 13, wherein said motor/generator is directly attached to said gas generator shaft.

17. The apparatus according to claim 13, wherein said at least one condition is at least one of temperature of said gas turbine engine, response of said gas turbine engine, or external electric load on said electrical generator.

18. An apparatus for controlling the speed of a drive shaft of an electrical generator attached to a power turbine shaft of a two spool gas turbine engine comprising:

a motor/generator rotationally attached to a gas generator shaft of said gas turbine engine;

at least one sensor for measuring at least one condition reflective of a change in external electric load drawn from said electrical generator;

a motor/generator controller for powering said motor/generator to adjust the rotational speed of said gas generator shaft; and an engine control unit for receiving a measurement from said at least one sensor and for instructing said motor/generator controller to drive said motor/generator based on said measurement.

19. The apparatus according to claim 18, wherein a fuel supply to said gas turbine engine is controlled by said engine control unit based on said measurement, thereby controlling a rotational speed of said gas generator shaft.

20. A two spool gas turbine engine comprising:

a power turbine shaft having an electrical generator rotationally attached thereto;

a power turbine attached to said power turbine shaft;

a gas generator shaft driven by a combustor of said gas turbine engine;

a compressor and a turbine attached to said gas turbine shaft;

said gas generator shaft providing an air flow to rotate said power turbine and said power turbine shaft, thereby driving said electrical generator;

a motor/generator rotationally attached to said gas generator shaft;

at least one sensor for measuring at least one condition reflective of a change in external electric load drawn from said electrical generator; and a motor/generator controller for powering said motor/generator to adjust the rotational speed of said gas generator shaft to power said electrical generator based on said external electric load.

21. The two spool gas turbine engine according to claim 20, further comprising an engine control unit for receiving a measurement from said at least one sensor and for instructing said motor/generator controller to drive said motor/generator based on said measurement.

22. The two spool gas turbine engine according to claim 20, wherein a fuel supply to said gas turbine engine is controlled by said engine control unit based on said measurement, thereby controlling a rotational speed of said gas generator shaft.

23. A method for controlling the speed of a two spool gas turbine engine comprising:

rotationally attaching a motor/generator to a gas generator shaft of said gas turbine engine;

rotationally attaching a drive shaft of an electrical generator to a power turbine shaft of said gas turbine engine;

measuring at least one condition reflective of a change in external electric load drawn from said electrical generator; and adjusting the rotational speed of said gas generator shaft to power said electrical generator based on said external electric load by providing an output from a motor/generator controller to power said motor/generator.

24. The method according to claim 23, further comprising providing an engine control unit to receive a measurement from said at least one sensor and to instruct said motor/generator controller to drive said motor/generator based on said measurement.

25. The method according to claim 24, further comprising controlling a fuel supply to said gas turbine engine with said engine control unit based on said measurement, thereby providing additional means to control the rotational speed of said gas generator shaft.

26. The apparatus according to claim 23, wherein said at least one condition is at least one of temperature of said gas turbine engine, response of said gas turbine engine, and external electric load on said generator.

* * * * *